United States Patent [19]

Havinis et al.

[11] Patent Number: 6,134,447

[45] Date of Patent: Oct. 17, 2000

[54] SYSTEM AND METHOD FOR MONITORING AND BARRING LOCATION APPLICATIONS

[75] Inventors: Theodore Havinis; Maya Roel-Ng, both of Plano, Tex.

[73] Assignee: Ericsson Inc., Research Triangle Park, N.C.

[21] Appl. No.: 09/086,875

[22] Filed: May 29, 1998

[51] Int. Cl.⁷ .................................................. H04Q 7/20
[52] U.S. Cl. ...................................... 455/456; 455/433
[58] Field of Search .................................. 455/456, 433, 455/404, 406, 414, 412, 413, 13.2, 524; 342/457, 463, 450, 357.1, 30, 33, 36; 379/320, 219

[56] References Cited

U.S. PATENT DOCUMENTS

| | | | |
|---|---|---|---|
| 5,600,706 | 2/1997 | Dunn et al. | 455/456 |
| 5,621,783 | 4/1997 | Lantto et al. | 455/406 |
| 5,625,671 | 4/1997 | Salin | 455/411 |
| 5,758,288 | 5/1998 | Dunn et al. | 455/456 |
| 5,884,169 | 3/1999 | Uchiyama et al. | 455/433 |
| 5,920,818 | 7/1999 | Frodigh et al. | 455/443 |
| 5,973,643 | 10/1999 | Hawkes et al. | 342/457 |
| 6,002,932 | 12/1999 | Kingdon et al. | 455/433 |
| 6,011,974 | 1/2000 | Cedervall et al. | 455/456 |
| 6,064,887 | 5/2000 | Kallioniemi et al. | 455/445 |
| 6,073,013 | 6/2000 | Agre et al. | 455/404 |

FOREIGN PATENT DOCUMENTS

| | | |
|---|---|---|
| 2 317 305 | 3/1998 | United Kingdom . |
| WO 98/00988 | 1/1998 | WIPO . |

OTHER PUBLICATIONS

PCT International Search Report dated Aug. 24, 1999.

*Primary Examiner*—William G. Trost
*Assistant Examiner*—Jean Alland Gelin
*Attorney, Agent, or Firm*—Jenkens & Gilchrist, P.C.

[57] ABSTRACT

A telecommunications system and method is disclosed for administration of location services by using black and gray location application lists within a positioning gateway. When a location application subscribes to location services, the wireless service provider assigns a unique Location Application Identifier Number (LAIN) to the location application, which is included in every positioning request. The black list is used to bar service to the location applications included in the list, while maintaining the location application's location application profile in the positioning gateway. Location applications included in the gray list are not barred from service, but instead are monitored by the wireless operator.

20 Claims, 4 Drawing Sheets

SYSTEM AND METHOD FOR MONITORING AND BARRING LOCATION APPLICATIONS

BACKGROUND OF THE PRESENT INVENTION

Field of the Invention

The present invention relates generally to telecommunications systems and methods for determining whether a location application has the authority to request positioning of a mobile terminal within a cellular network, and specifically to providing the gateway mobile switching center with a list of location applications which are barred from requesting positioning of mobile terminals and a list of location applications which has their positioning requests monitored.

Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., Where am I service.

As can be seen in FIG. 2 of the drawings, upon a network positioning request, the Base Station System (BSS) (220 and 240) serving the MS 200 to be positioned generates positioning data, which is delivered to the MSC 260. This positioning data is then forwarded to a positioning gateway, e.g., for GSM systems, this is referred to as a Mobile Location Center (MLC) 270, for calculation of the geographical location of the MS 200. The location of the MS 200 can then be sent to a Location Application (LA) 280 that requested the positioning. Alternatively, the requesting LA 280 could be located within the MS 200 itself, within the MSC/VLR 260 or could be an external node, such as an Intelligent Network (IN) node.

In order to accurately determine the location of the MS 200, positioning data from three or more separate BTS's (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the MLC 270.

It should be understood, however, that any estimate of time, distance, or angle for any cellular system 205 can be used, instead of the TA value discussed herein. For example, the MS 200 can have a Global Positioning System (GPS) receiver built into it, which is used to determine the location of the MS 200. In addition, the MS 200 can collect positioning data based on the Observed Time Difference (OTD) between the time a BTS 220 sends out a signal and the time the MS 200 receives the signal. This time difference information can be sent to the MLC 270 for calculation of the location of the MS 200. Alternatively, the MS 200, with knowledge of the location of the BTS 220, can determine its location.

As positioning services become more available, many wireless service providers will begin offering subscriptions for location services to location applications (LAs). With a subscription, a location application profile is created for the LA in a positioning gateway. For GSM systems, the positioning gateway is called a Gateway Mobile Location Center (GMLC). In order to use the service, the LA will need to send a positioning request to the positioning gateway or GMLC. The positioning gateway will then accept or reject the location request.

However, certain LAs may not have paid their bill, or LAs may not be using the location service correctly. For example, an LA may continually attempt to locate subscribers who have restricted the ability of that LA to position them. In this instance, the wireless service provider may wish to discontinue providing location services to that LA. However, wireless service providers currently have no way of monitoring the activities of the LAs or restricting the ability of LAs to position subscribers.

It is, therefore, an object of the present invention to provide a list of location applications within the positioning gateway which are currently barred from positioning subscribers within the cellular network, while preserving the subscription for these location applications.

It is a further object of the present invention to provide a list of location applications within the positioning gateway whose positioning activities need to be monitored by the wireless service provider.

SUMMARY OF THE INVENTION

The present invention is directed to telecommunications systems and methods for administration of location services by using black and gray location application lists within the positioning gateway. When a location application (LA) subscribes to location services, the wireless service provider assigns a unique Location Application Identifier Number (LAIN) to the LA, which is included in every positioning request. The black list is used to bar service to the LAs included in the list, while maintaining the LA's location application profile in the positioning gateway. LAs included in the gray list are not barred from service, but instead are monitored by the wireless operator.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
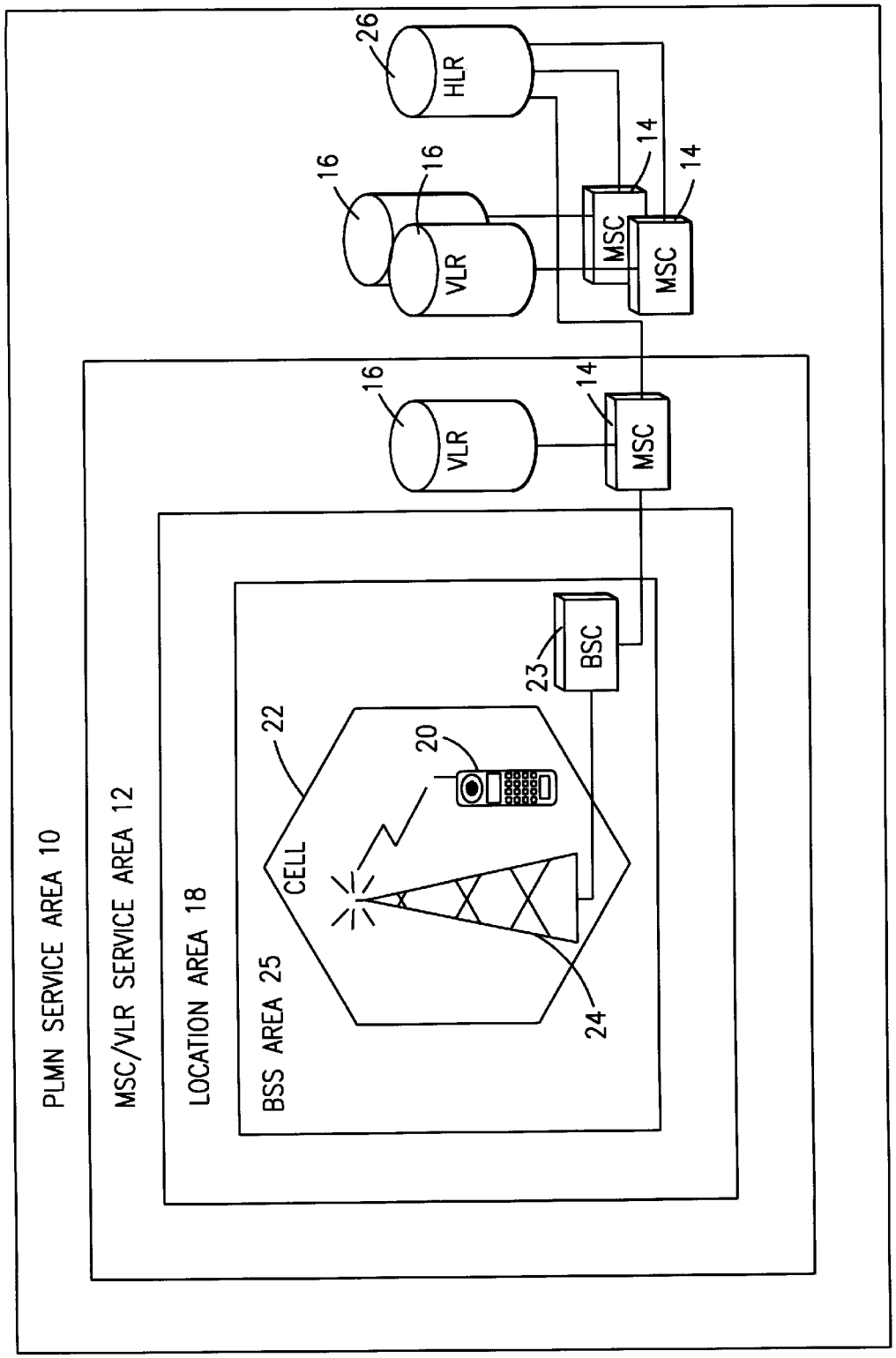
FIG. 1 is a block diagram of a conventional terrestrially-based wireless telecommunications system.
Figure 2:
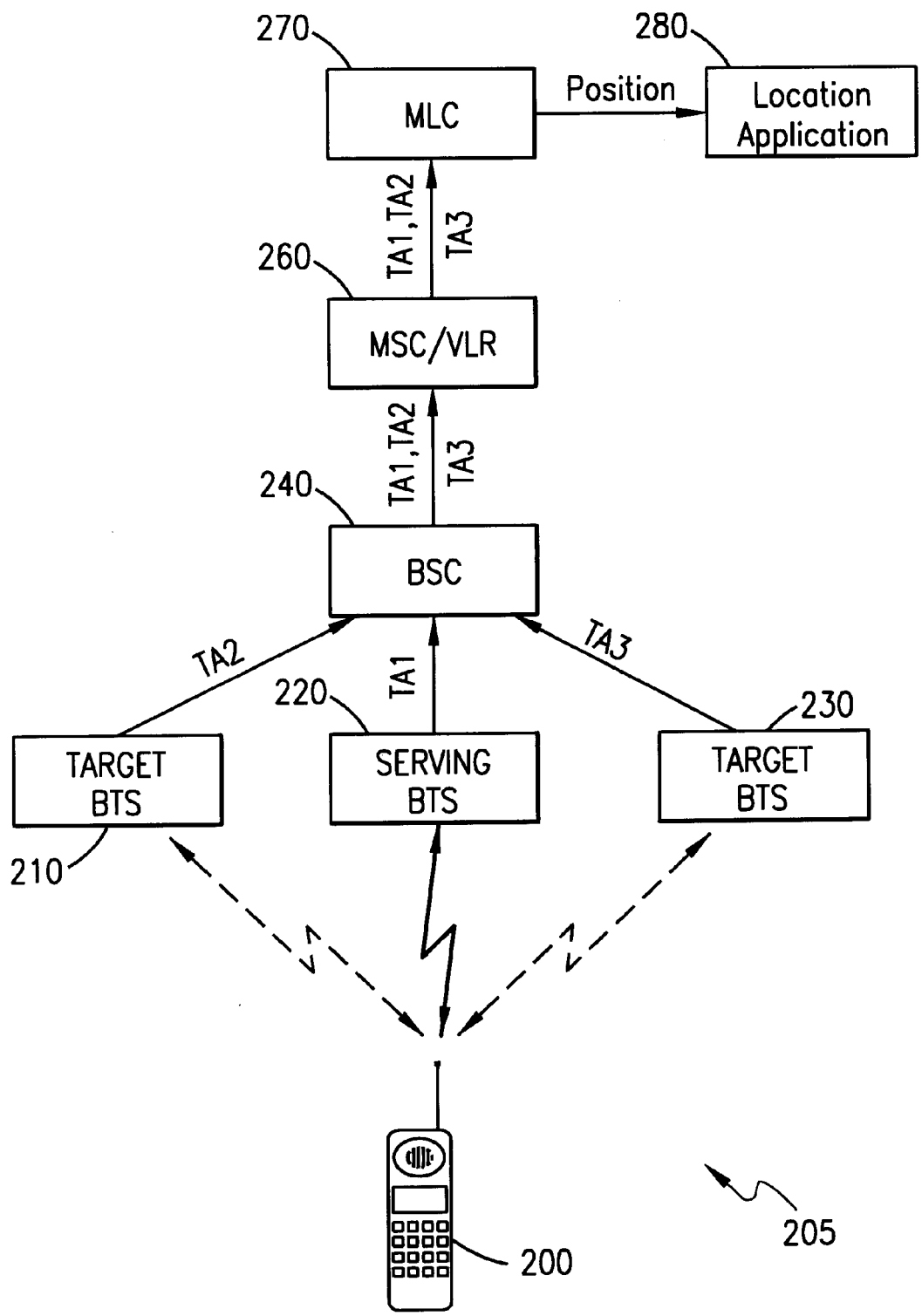
FIG. 2 illustrates a sample positioning handover in which positioning data is acquired by a target base transceiver station and transmitted to a serving base station controller.
Figure 3:
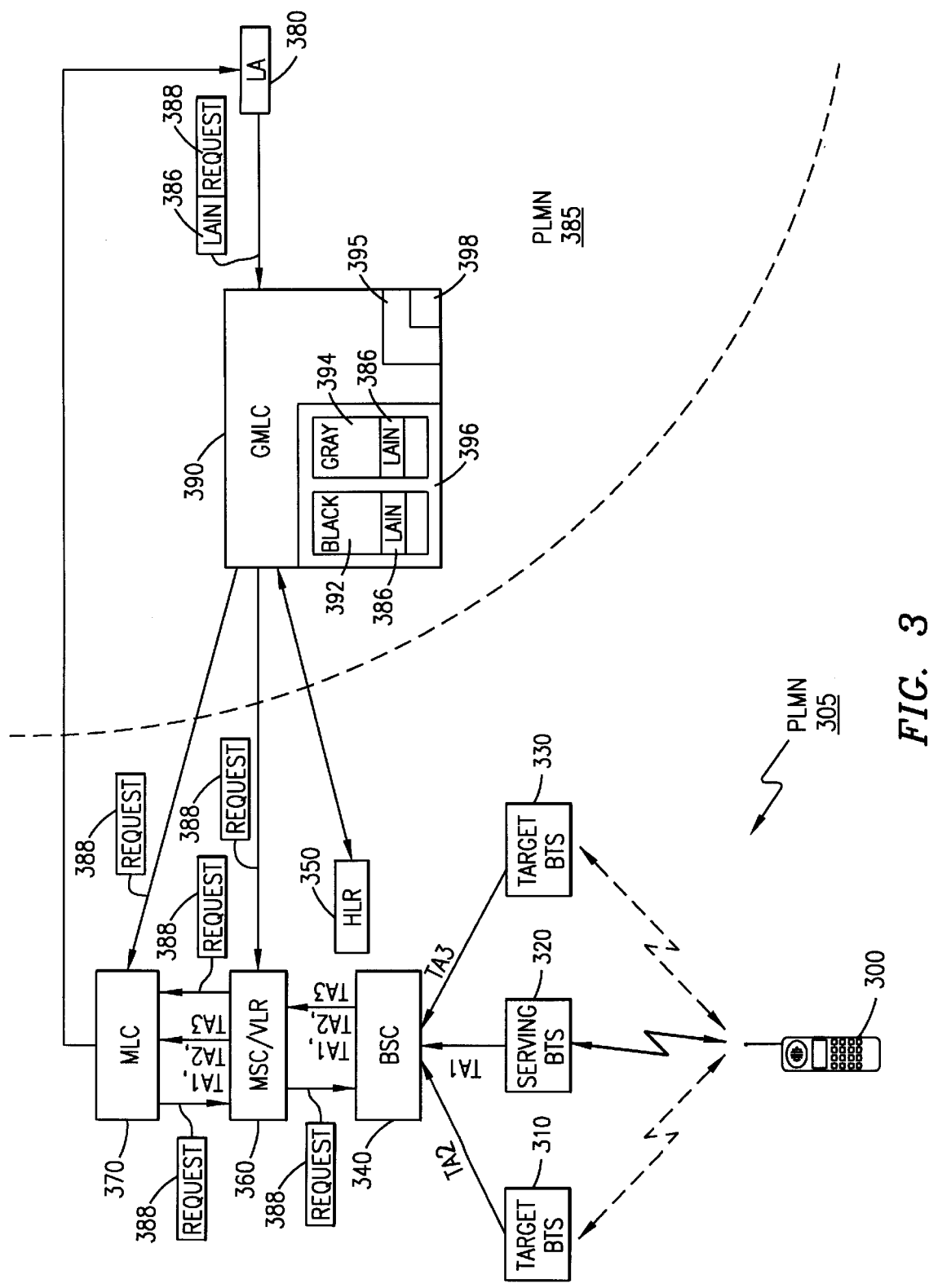
FIG. 3 is a block diagram demonstrating the administration of location services by a positioning gateway in accordance with preferred embodiments of the present invention.

With reference now to FIG. 3 of the drawings, a black location application list 392 and a gray location application list 394, which are stored within a database 396 in a positioning gateway 390, can be used by wireless service providers for the administration of location services. A Location Application (LA) 380 must first register with a positioning gateway, e.g., for Global System for Mobile Communications Networks, a Gateway Mobile Location Center (GMLC) 390, and define within, for example, a database 395 within the GMLC 390 its location services profile 398, e.g., all of the relevant service parameters specific to that LA 380. For example, the LA 380 can define whether the LA 380 has the authority to override privacy settings of all subscribers, as in the case of an emergency center, or particular subscribers, as in the case of a law enforcement agency. Furthermore, the LA 380 can define whether the LA 380 is associated with a group of subscribers, e.g., a fleet management company, and the particular Mobile Station International Subscriber Directory Number's (MSISDN's) associated with that group. The MSISDN is the digit string associated with a particular Mobile Station (MS) 300.

Once the LA 380 has defined the service parameters 398 specific to that LA 380, the GMLC 390 assigns a Location Application Identifier Number (LAIN) 386, which identifies the particular LA 380 and the associated service parameters 398. Thereafter, the requesting LA 380 can send its LAIN 386 in a positioning request 388 for a particular MS 300 or a group of MS's 300 to the GMLC 390, which is the GMLC 390 for the Public Land Mobile Network (PLMN) 385 that the LA 380 is in. When an LA 380 terminates its location subscription with the wireless service provider, the location application profile 398 assigned to the LA 380 is removed from the database 395 within the GMLC 390.

In order to determine whether an LA 380 with a current location application profile 398 is allowed to position MSs 300, the wireless service provider can include a black location application list 392 within the GMLC 390. The black list 392 contains the LAINs 386 of the LAs 380 which are currently barred from positioning MSs 300. Only the LAINs 386 of LAs 380 which are currently registered with the GMLC 390 can be included in the black list 392.

The black list 392 can be used by the wireless service provider to temporarily bar the use of the location service by LAs 380 included in the list 392. Since the location subscription for an LA 380 within the list 392 has not yet been terminated, the LA's 380 location application profile 398 remains in the GMLC 390. It should be noted that the wireless service provider can permanently bar an LA 380 from using location services by removing its location application profile 398 from the database 395 within the GMLC 390.

As an example, the LAIN 386 for a particular LA 380 can be included within the black list 392 when that LA 380 has not paid its location services bill. Thus, when the LA 380 sends a positioning request 388 along with its LAIN 386 to the GMLC 390, the GMLC 390 can cross-reference the LAIN 386 with the black list 392 of LAIN's 386 to determine if the LA 380 is barred from requesting positioning. If the LAIN 386 sent by the LA 380 is included within the black list 392 of LAINs 386, the GMLC 390 sends a rejection message to the LA 380 informing the LA 380 that it has been barred from requesting positioning of MS's 300.

In this way, the wireless service provider can ensure that the LAs 380 requesting positioning have paid for the location service. The wireless service provider can remove the LAIN 386 of a particular LA 380 from the black list 392 when that particular LA 380 becomes current with its payments. It should be understood that LAIN's 386 of LAs 380 can be included within the black list 392 for a number of reasons, which can be specific to each wireless service provider.

In other situations, the wireless service provider may desire to monitor the positioning requests 388 of a certain LA 380. Therefore, a gray list 394 of LAs 380 can be included within the GMLC 390 to indicate the LAs 380 which need to have their activities monitored by the wireless service provider, but are not barred from requesting positioning.

For example, an LA 380 may have requested positioning of one or more particular MSISDNs belonging to government officials without authorization. Although the GMLC 390 rejects these requests 388, the activity may be considered suspicious, and the wireless service provider may want to monitor the positioning requests 388 of this LA 380. By monitoring, it should be understood that the GMLC 390 can keep track of the LAIN, the MSISDN and the time and date that positioning information was requested. Therefore, the wireless service provider includes the LAIN 386 of the LA 380 in the gray list 394 so that when a positioning request 388 from this LA 380 is received in the GMLC 390, the wireless service provider is notified.

Figure 4:
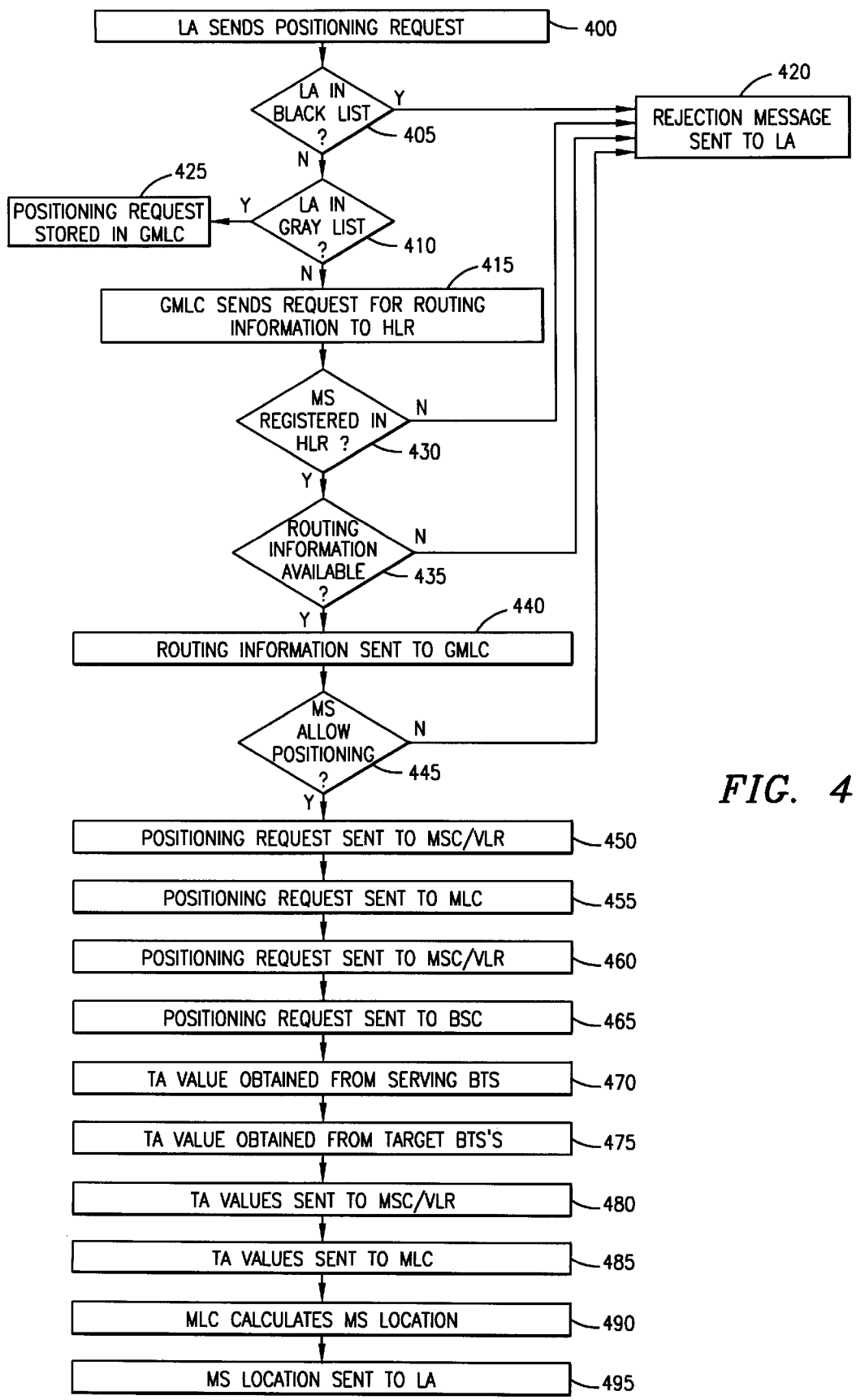
FIG. 4 shows steps in a sample positioning of a mobile terminal when a location application requesting positioning is neither barred nor monitored by the positioning gateway.

With reference now to FIG. 4 of the drawings, which will be described in connection with FIG. 3 of the drawings, after the GMLC 390 receives the positioning request 388 along with the associated LAIN 386 from an LA 380 and determines that the LAIN 386 of the LA 380 is registered with the GMLC 390 (step 400) and not included in either the black list 392 (step 405) or the gray list 394 (step 410), the GMLC 390 can then send a request for routing information (step 415), e.g., the address of the Mobile Switching Center/Visitor Location Register (MSC/VLR) 360 serving the PLMN 305 that the MS 300 associated with the MSISDN or subscriber to be positioned is currently located in and positioning subscription information for the MS 300, to the MS's 300 Home Location Register (HLR) 350, using the MS's 300 directory number as a global title. The signaling network, e.g., the Signaling System #7 (SS7) network (not shown), can perform a global title translation on the Mobile Station International Subscriber Directory Number (MSISDN) and route the request to the appropriate HLR 350 for the MS 300. It should be understood that if the LAIN 386 of the LA 380 is included in the black list 392 (step 405), a rejection message is sent to the LA 380 (step 420), and if the LAIN 386 of the LA 308 is included in the gray list 394 (step 410), the positioning request and any additional information, e.g., whether the subscriber allows positioning, is stored in the database (or memory) 395 or 396 within the GMLC 390 for monitoring purposes (step 425).

The HLR 350 then checks its records to confirm that the MSISDN is registered in the HLR 350 (step 430), and that routing information for that MSISDN is available (step 435). If the MSISDN is not registered in the HLR 350 (step 430) or the routing information is not available (step 435), the routing information request is rejected by the HLR 350 and the GMLC 390 sends a rejection message to the LA 380 (step 420). However, if the MSISDN is registered in the HLR 350 (step 430) and routing information is available (step 435), the routing information, e.g., the serving MSC/VLR 360 address, together with the positioning subscription information, is sent to the GMLC 390 (step 440).

The GMLC 390 then verifies that the subscriber or MSISDN associated with the MS 300 to be positioned by the LA 380 allows positioning to be performed, by checking the positioning subscription information, e.g., privacy indication, sent by the HLR 350 (step 445). Alternatively, the serving MSC/VLR 360 or serving Mobile Location Center (MLC) 370 can check the privacy indication of the MSISDN. However, if, for example, the LA 380 is an emergency center or a law enforcement agency, the LA 380 can define its location services 398 such that the privacy indications established by the subscriber can be overridden to perform positioning. In this case, the GMLC 390 does not check the privacy indications of the MSISDN. If the MSC/VLR 360 or MLC 370 normally performs the check, the privacy override indication is passed onto the MSC/VLR 360 or MLC 370 from the GMLC 390 along with the positioning request 388. It should be noted that other service parameters (either defined originally by the LA 380 or sent with the positioning request 388) can also be passed onto additional nodes during the positioning process.

If the MSISDN associated with the MS 300 to be positioned does not allow positioning (step 445), the positioning request 388 is rejected and a rejection message is sent to the LA 380 (step 420). However, if the MSISDN does allow positioning (step 445), the GMLC 390 can then send the positioning request 388 to the serving MSC/VLR 360 (step 450), using the MSC/VLR 360 address. Thereafter, the serving MSC/VLR 360 will route the positioning request 388 to the MLC 370 serving the PLMN 305 that the MS 300 is located in (step 455). It should be understood that the MLC 370 can be co-located with the serving MSC/VLR 360 or can be a separate node.

Alternatively, after the GMLC 390 confirms that the MSISDN allows positioning to be performed (step 445), the GMLC 390 can derive, from the MSC/VLR 360 address, the address of the MLC 370 in the serving PLMN 305, using, for example, a look-up table (database). Thereafter, the positioning request 382 or 384 can be routed directly to the MLC 370 in the serving PLMN 305 (step 455).

Once the positioning request 382 or 384 is received by the serving MLC 370 (step 455), the MLC 370 sends the positioning request 388 to the serving MSC/VLR 360 (step 460), which can then forward the positioning request 388 to a Base Station Controller (BSC) 340 (step 465). If the MS 300 is in idle mode, the serving MSC/VLR 360 must page the MS 300 and setup a call to the MS 300 prior to forwarding the positioning request 388 to the BSC 340 (step 465). This call does not activate the ringing tone on the MS 300, and therefore, is not noticed by the MS 300.

The originating BSC 340 then determines which Base Transceiver Station (BTS) 320 is currently serving the MS 300, and obtains a Timing Advance (TA) value (TA1), or other positioning data, from this serving BTS 320 (step 470), if possible. Thereafter, TA values are obtained from at least two target BTSs (310 and 330) (step 475) by performing a positioning handover. If the serving BTS 320 does not support positioning, an additional target BTS (not shown) must be selected. It should be noted that other positioning methods can be used instead of obtaining TA values, as discussed herein. In addition, positioning of the MS 300 can be performed using more than three BTSs (310, 320, and 330).

The TA values (TA2 and TA3) measured by the target BTS's (310 and 330) are then transmitted by the serving BSC 340 to the MSC 360, together with the TA value TA1 obtained from the serving BTS 320 (step 480). Finally, the TA values (TA1, TA2 and TA3) are forwarded to the serving MLC 370 from the MSC/VLR 360 (step 485), where the location of the MS 300 is determined using the triangulation algorithm (step 490). The MLC 370 then presents the geographical position of the MS 300 to the requesting LA (node) 380 (step 495).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for administration of location services within a cellular network, said telecommunications system comprising:
    a positioning gateway within said cellular network, said positioning gateway having a database therein, said database storing a black list including at least one of a plurality of location application identifier numbers and a gray list including at least one of said location application identifier numbers therein, each of said location application identifier numbers identifying a respective one of a plurality of location nodes configured to request positioning of at least one mobile terminal within said cellular network; and
    a given one of said plurality of location nodes in communication with said positioning gateway, said given location node having a given one of said location application identifier numbers associated therewith, said given location node sending a positioning request including said given location application identifier number to said positioning gateway, said positioning gateway barring said positioning request when said given location application identifier number is within said black list and monitoring said positioning request when said given location application identifier number is within said gray list.

2. The telecommunications system of claim 1, wherein said positioning gateway is a Gateway Mobile Location Center.

3. The telecommunications system of claim 1, wherein said positioning request is associated with a given one of a plurality of mobile terminals in wireless communication with a mobile switching center, said mobile switching center being connected to said positioning gateway, said positioning gateway sending said positioning request to said mobile switching center when said given location application identifier number is not included within said black list.

4. The telecommunications system of claim 3, wherein said mobile switching center obtains positioning data associated with said given mobile terminal and forwards said positioning data to a mobile location center connected to said mobile switching center, said mobile location center determining the location of said given mobile terminal within said cellular network and sending the location of said given mobile terminal to said location node.

5. The telecommunications system of claim 4, wherein said mobile switching center receives said positioning request via said mobile location center.

6. The telecommunications system of claim 1, wherein said positioning gateway sends a rejection message to said location node when said positioning gateway bars said positioning request.

7. The telecommunications system of claim 1, wherein said positioning request and monitoring information is stored in said positioning gateway when said positioning request is monitored by said positioning gateway.

8. A method for administration of location services within a cellular network, said method comprising the steps of:
    storing, within a positioning gateway within said cellular network, a black list including at least one of a plurality of location application identifier numbers and a gray list including at least one of said location application identifier numbers therein, each of said location application identifier numbers identifying a respective one of a plurality of location nodes configured to request positioning of at least one mobile terminal within said cellular network;
    sending, by a given one of said plurality of location nodes having a given one of said location application identifier numbers associated therewith, a positioning request including said given location application identifier number to said positioning gateway;
    barring, by said positioning gateway, said positioning request when said given location application identifier number is within said black list; and
    monitoring, by said positioning gateway, said positioning request when said given location application identifier number is within said gray list.

9. The method of claim 8, wherein said positioning gateway is a Gateway Mobile Location Center.

10. The method of claim 8, wherein said positioning request is associated with a given one of a plurality of mobile terminals in wireless communication with a mobile switching center, said mobile switching center being connected to said positioning gateway, and further comprising, after said step of monitoring, the step of:
    sending, by said positioning gateway, said positioning request to said mobile switching center when said given location application identifer number is not included within said black list.

11. The method of claim 10, further comprising, after said step of sending, the steps of:

obtaining, by said mobile switching center, positioning data associated with said given mobile terminal;

forwarding, by said mobile switching center, said positoning data to a mobile location center connected to said mobile switching center;

determining, by said mobile location center, the location of said given mobile terminal within said cellular network; and sending, by said mobile location center, the location of said given mobile terminal to said location node.

12. The method of claim 11, wherein said mobile switching center receives said positioning request via said mobile location center.

13. The method of claim 8, further comprising, after said step of barring, the step of:

sending, by said positioning gateway, a rejection message to said location node when said positioning gateway bars said positioning request.

14. The method of claim 8, wherein said step of monitoring is performed by storing said positioning request and monitoring information in said positioning gateway.

15. A positioning gateway within a cellular network for administration of location services, said positioning gateway comprising:

a database having a black list including at least one of a plurality of location application identifier numbers and a gray list having at least one of said location application identifier numbers, each of said location application identifier numbers identifying a respective one of a plurality of location nodes configured to request positioning of at least one mobile terminal within said cellular network;

receiving means for receiving a positioning request including a given one of said location application identifier numbers from a given one of said plurality of location nodes;

barring means for barring said positioning request when said given location application identifier number is within said black list; and monitoring means for monitoring said positioning request when said given location application identifier number is within said gray list.

16. The positioning gateway of claim 10, wherein said positioning gateway is a Gateway Mobile Location Center.

17. The positioning gateway of claim 15, further comprising sending means for sending said positioning request to a mobile switching center connected to said positioning gateway when said given location application identifier number is not included within said black list.

18. The positioning gateway of claim 15, further comprising sending means for sending a rejection message to said given location node when said positioning gateway bars said positioning request.

19. The positioning gateway of claim 15, further comprising a memory for storing said positioning request and monitoring information when said positioning request is monitored by said positioning gateway.

20. The positioning gateway of claim 19, wherein said memory comprises said database.

* * * * *

UNITED STATES PATENT AND TRADEMARK OFFICE
CERTIFICATE OF CORRECTION

PATENT NO : 6,134,447
DATED : October 17, 2000
INVENTOR(S) : Havinis, et al.

It is certified that error appears in the above-identified patent and that said Letters Patent are hereby corrected as shown below:

Column 9, line 1  Replace "identifer"
With --identifier--

Column 9, lines 7-8  Replace "positoning"
With --positioning--

Signed and Sealed this

Twenty-fourth Day of April, 2001

*Attest:*

NICHOLAS P. GODICI

*Attesting Officer*  *Acting Director of the United States Patent and Trademark Office*